United States Patent [19]

Nagano

[11] Patent Number: 4,744,265
[45] Date of Patent: May 17, 1988

[54] LEVER SHIFTING DEVICE FOR A BICYCLE

[75] Inventor: Masashi Nagano, Izumi, Japan

[73] Assignee: Shimano Industrial Company Limited, Osaka, Japan

[21] Appl. No.: 839,970

[22] Filed: Mar. 17, 1986

[30] Foreign Application Priority Data

Mar. 20, 1985 [JP] Japan .................................. 60-56682

[51] Int. Cl.⁴ .......................... G05G 1/04; G05G 5/06; B60K 20/00
[52] U.S. Cl. ........................................ 74/523; 74/527; 74/475
[58] Field of Search ................ 74/527, 523, 531, 539, 74/540, 489, 475, 502.2, 501.6; 192/48.1, 48.3; 280/289 H, 236; 474/82

[56] References Cited

U.S. PATENT DOCUMENTS

| 3,352,173 | 11/1967 | Freeland | 280/236 |
| 3,662,618 | 5/1972 | Kroll et al. | 74/527 |
| 3,782,210 | 1/1974 | Holleman | 280/236 |
| 3,974,707 | 8/1976 | Nagano | 280/236 |
| 4,232,564 | 11/1980 | Yamasaki | 74/475 |
| 4,267,744 | 5/1981 | Yamasaki | 74/475 |
| 4,270,481 | 6/1981 | Watarai | 74/475 |
| 4,343,201 | 8/1982 | Shimano | 74/475 |
| 4,470,823 | 9/1984 | Shimano | 74/475 |
| 4,548,092 | 10/1985 | Strong | 74/475 |

FOREIGN PATENT DOCUMENTS 0157983 10/1985 European Pat. Off. .
3607548 9/1986 Fed. Rep. of Germany .

Primary Examiner—Gary L. Smith
Assistant Examiner—Vinh Luong
Attorney, Agent, or Firm—Stevens, Davis, Miller & Mosher

[57] ABSTRACT

A lever shifting device for a bicycle is provided with a positioning mechanism comprising a positioning member having a plurality of engaging portions and an engaging member engageable with one of the engaging portions. A friction mechanism has friction portions, so that the positioning mechanism and friction mechanism can be switched to each other. The engaging portions and friction portions are disposed in the same plane perpendicular to the axis of rotation of an operating lever, but radially displaced from each other.

3 Claims, 5 Drawing Sheets

4,744,265

LEVER SHIFTING DEVICE FOR A BICYCLE

FIELD OF THE INVENTION

The present invention relates to a lever shifting device for a bicycle, and more particularly to a lever shifting device provided with a positioning mechanism and a friction mechanism which are capable of being selectively switched in operation.

BACKGROUND OF THE INVENTION

A conventional lever shifting device for a bicycle, supporting an operating lever for a derailleur rotatably to a fixing member having a lever shaft, is well-known, provided with the lever positioning mechanism comprising a positioning member with a a plurality of engaging positions and an engaging member engageable with at least one engaging position, and with the friction mechanism for applying to the lever a rotational resistance against a return spring at the derailleur.

The applicant of the present invention has filed Japanese Patent Application No. Sho 59-67,163 which discloses a lever shifting device for a bicycle, provided with the positioning mechanism and friction mechanism.

This device disposes the positioning mechanism and friction mechanism around the lever shaft supporting the operating lever spaced apart axially thereof from each other, so that a mounting screw can be tightened or loosened to selectively switch both mechanisms to engage each other in operation, or a distinct switching mechanism for the positioning mechanism can be provided separate from the mounting screw to thereby adjust the mounting screw to switch the friction mechanism from an operative state to an inoperative state.

Such device, however, is provided with the positioning mechanism and friction mechanism separate each from the other and axially shiftable, thereby creating the problem that the device is complicated in construction, is time consuming in production and assembly, has a high manufacturing costs, and is both large-sized and heavy in weight.

SUMMARY OF THE INVENTION

An object of the invention is to provide a lever shifting device for a bicycle, which is simple in construction, provides improved efficiency in assembly, and is able to selectively operate the positioning mechanism and friction mechanism.

Another object of the invention is to provide a lever shifting device for a bicycle, which is of good workability and of small size.

The present invention is characterized in that the lever shifting device for operating the derailleur of a bicycle is provided with a fixing member having a lever shaft, an operating lever supported rotatably relative to the lever shaft, a positioning mechanism provided with a positioning member having a plurality of engaging portions and an engaging member engageable with at least one engaging portion, a friction mechanism having friction portions for applying to the lever a rotational resistance against a return spring at the derailleur, the engaging portions and friction portions being disposed in a plane perpendicular to the axis of rotation of the lever but shifted in phase from each other, and switching means for shifting one of the positioning member and engaging member with respect to the other, whereby the engaging member disengages from the engaging portion and then engages with the friction portion.

In the present invention, the engaging portions and friction portions are disposed in the same plane, and can be formed together on one positioning member, so that a particular friction member is not required. The complicated structure caused by the friction mechanisms of the prior art is minimized, and the friction portions and engaging portions are molded at the same time in a single stroke of a molding machine and are easy to machine during the cutting process for the engaging portions, thereby improving the method of construction.

Also, the friction mechanism is easy to assemble with the positioning mechanism, whereby the aforesaid method of construction as well as the improved efficiency of assembling contributes to lower production costs.

Moreover, the provision of the engaging portions and friction portions in the same plane, which plane is perpendicular to the axis of rotation of the operating lever can, when a rolling member is used as the engaging member, support the engaging member in the plane against the effects of gravity during the assembly thereof, thereby preventing the engaging member from falling, resulting in increased efficiency.

In addition, when the engaging portions and friction portions of the device are disposed in the same plane, the friction members may be separate from the positioning member and both members may be disposed radially of the lever shaft. It is preferred that the friction members be provided in the plane of the positioning member. In this case, the engaging portions may be shifted radially or circumferentially from the friction portions.

These and other objects of the invention will be more fully understood by reference to the description, and the accompanying drawings.

BRIEF DESCRIPTION OF THE INVENTION

FIG. 1 is an enlarged longitudinal sectional view of an embodiment of a lever shifting device of the invention, FIG. 2 is a cross-sectional plan view of the FIG. 1 embodiment, FIG. 3 is a plan view of a positioning member, FIG. 4 is a plan view of a switching member, FIG. 5 is a plan view of a leaf spring, FIG. 6 is a partially cutaway side view thereof, FIG. 7 is a sectional view taken on the line VII—VII in FIG. 5, FIG. 8 is a cross-sectional plan view of an association portion of the positioning member with an operating lever, FIG. 9 is a partially sectional view of the operating state of a friction mechanism, corresponding to that embodiment illustrated in FIG. 1, FIG. 10 is a cross-sectional plan view of the same, corresponding to FIG. 2, FIG. 11 is an enlarged cross-sectional front view of a further embodiment of the invention, FIG. 12 is a cross-sectional view of the FIG. 11 embodiment, FIG. 13 is a partially perspective view of a positioning member of the same, FIG. 14 is a partially perspective view of an engaging member of the same, and FIG. 15 is a partially enlarged sectional view of a positioning mechanism.

DETAILED DESCRIPTION OF THE INVENTION

Figure 1:
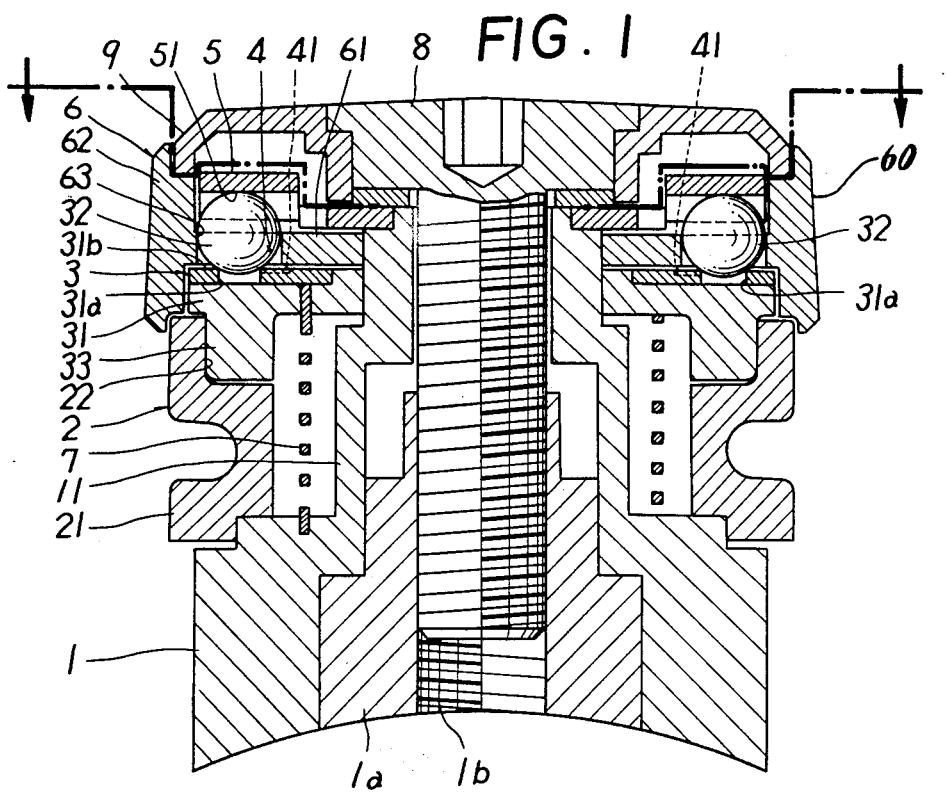

Referring to FIG. 1, a lever-shifting device is shown which is provided with a fixing member 1 having a cylindrical lever shaft 11, an operating lever 2 supported rotatably relative to the lever shaft 11, a positioning mechanism 3 therefor, and a friction mechanism 4, which applies to the operating lever 2, a rotational resistance against a return spring at a derailleur (not shown) of the bicycle. The fixing member 1 is fixed to the bicycle frame through fixing means, such as welding or a tightened band.

The operating lever 2 comprises a cylindrical boss 21 and a control portion (not shown) extending radially outwardly from the boss 21.

The positioning mechanism 3 comprises a positioning member 31 having a plurality of engaging portions 31a and an engaging member 32 engageable with one of the engaging portions 31a, the positioning member 31 being supported rotatably relative to the lever shaft 11, the engaging member 32 being supported to the fixing member 1 and biased toward the engaging portions 31a through a leaf spring 5.

Figure 8:
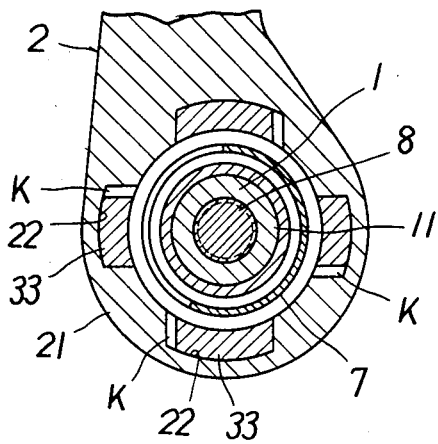

One of the inner periphery of a center bore at the boss 21 and the outer periphery at one side of the positioning member 31, as shown in FIG. 8, is provided with a plurality of engaging recesses 22 and the other of the same is provided with engaging projections 33, so that the positioning member 31 operates in association with the rotation of the operating lever 2 through predetermined gaps K.

Figure 2:
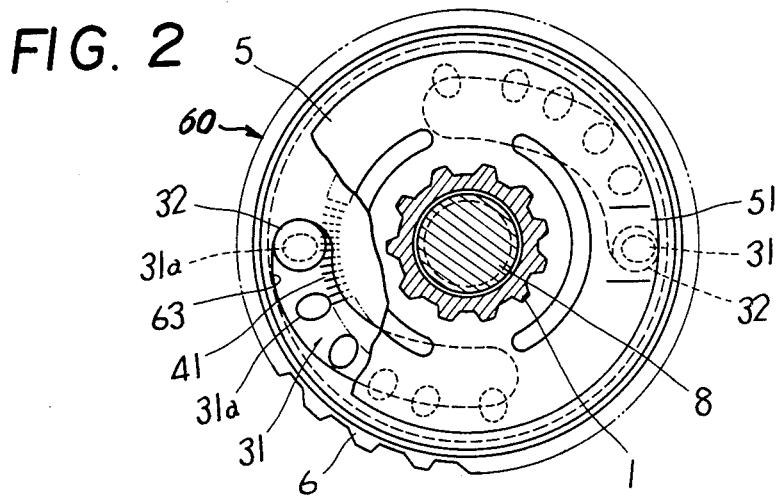

In the embodiment in FIGS. 1 and 2, the positioning member 31 is formed of a disc having a center bore, and lying at one side in the plane 31b perpendicular to the axis of rotation of the lever 2, and the engaging portions 31a and friction portions 41 also lie in the plane 31b but being radially displaced therefrom. Switching means 6 is provided, by which the engaging members 32 are shifted radially of the positioning member 31 to disengage from the engaging portions 31a and engage with the friction portions 41.

Figure 3:
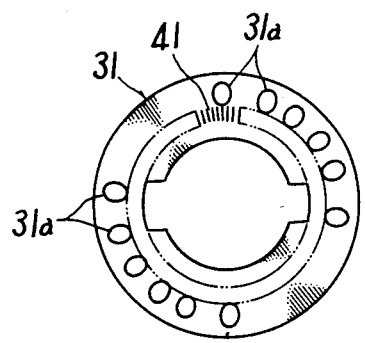

A plurality of engaging portions 31a, as shown in FIG. 3, are provided on the positioning member 31 in circumferentially spaced relation at predetermined intervals. The friction portions 41 comprised of serrations are circumferentially disposed on the positioning member 31 and radially inwardly of the engaging portions 31a. In addition, each engaging portion 31a comprises a through bore, or a recess. The shape of the bore or recess is illustrated in FIG. 3 as oval, but may be of other shape.

Alternatively, the friction portions 41 may be rough, rather than serrated.

Figure 9:
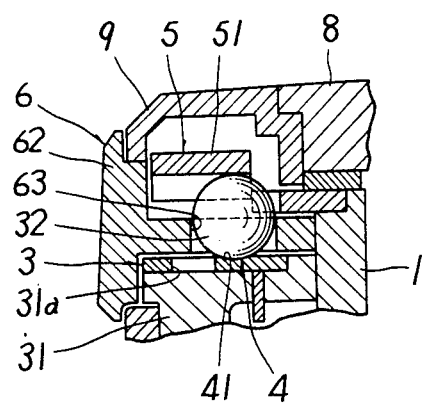

Also, the engaging members 32 illustrated as balls in FIGS. 1 and 9 may alternatively be rollers or the like, or may be integral with the leaf spring 5.

Figure 4:
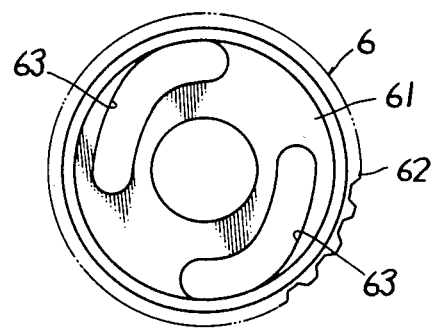
Figure 5:
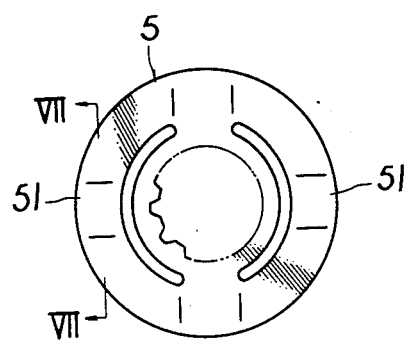
Figure 6:
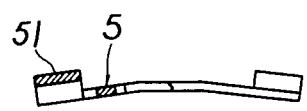
Figure 7:

The leaf spring 5 is formed of a disc having a non-cylindrical bore which is fitted non-rotatably onto the utmost end of the lever shaft 11. Provided opposite to the engaging members 32 are holding portions 51 each semicylindrical in section to thereby prevent the engaging members 32 from rotating together with the positioning member 31 but allowing the same to move radially of the positioning member 31. Alternatively, the holding portions 51 may be elongated. slots The switching means 6, as shown in FIG. 4, comprises a switching member 60 provided with a disc 61 having a through bore fitted rotatably onto the lever shaft 11 and control portions 62 formed at the outer periphery of the disc 61. The disc 61 is provided with guide bores 63 extending circumferentially and radially inwardly of the disc 61 at the portions thereof opposite to the engaging members 32, the switching member 60 rotating to move the engaging members 32 only radially of the positioning member 31 along the holding portions 51 respectively.

Figure 10:
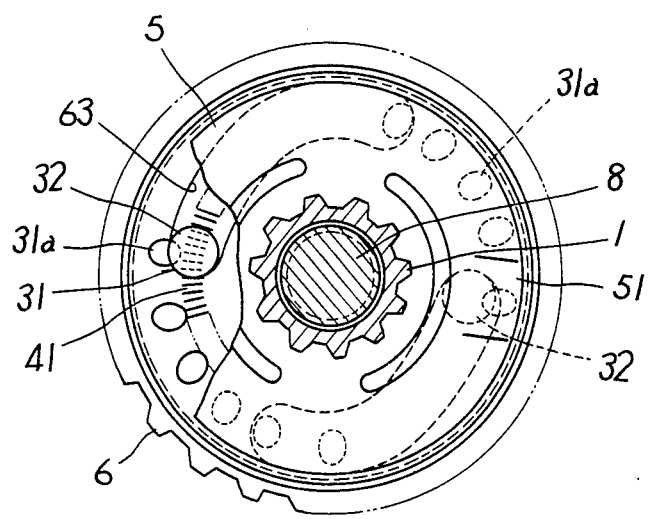

The friction mechanism 4, as shown in FIGS. 9 and 10, includes friction portions 41 which are provided on the positioning member 31, engaging members 32 and leaf spring 5. The switching member 60 is operated to move the engaging members 32 as foresaid and engage them with the friction portions 41 respectively, thereby applying the predetermined friction to the rotation of the positioning member 31, in turn the operating lever 2 in association therewith.

Also, the lever shifting device of the invention is provided with an auxiliary spring 7 positioned between the positioning member 31 and the fixing member for biasing the positioning member 31 opposite to the biasing direction of the return spring at the derailleur. The auxiliary spring 7 reduces the force necessary for forwardly operating the operating lever 2. Meanwhile, between the engaging recesses 22 at the lever 2 and the engaging projections 33 at the positioning member 33 are provided gaps K by which the lever 2, when forwardly operated, freely returns with respect to the positioning member 31 by an amount of over-shift of the lever 2 corresponding to each gap K. Alternatively, the gaps K may be provided between the engaging portions 31a and the engaging members 32 respectively.

Referring again to FIG. 1, reference numeral 8 designates a mounting screw which screws in a threaded bore 1b. A base 1a supports fixing member 1, and 9 designates a cover for covering the positioning mechanism 3.

In FIGS. 1 and 2, the positioning mechanism 3 is operative so that the engaging member 31 engages with any one of the engaging portions 31a. In such state, when the operating lever 2 is operated, the positioning member 31 rotates in association with the rotation of the lever 2 with respect to the engaging member 32, so that one engaging portion 31a engages with the engaging member 32, thereby maintaining the operating lever 2 in its operating position.

In the case where the lever-shifting device of the invention is switched from the operative state of the positioning mechanism 3 to that of the friction mechanism 4, the switching member 60 rotates clockwise in FIG. 2, whereby an operating force of switching member 60 acts on each engaging member 32 through the guide bore 63. Hence, the engaging member 32 moves radially inwardly of the positioning member 31 along the holding portion 51 at the leaf spring 5, thereby disengaging from the engaging portion 31a to make inoperative the positioning mechanism 3. Meanwhile, the engaging members 32, as shown in FIGS. 9 and 10, engage with the friction portions 41, thereby applying a predetermined friction to the friction portions 41 to make operative the friction mechanism 4.

Hence, the operating lever 2 is operated through the operative friction mechanism 4 and maintained in position by the friction mechanism 4.

Now, the operation of leaf spring 5 will be described. When the engaging member 32 engages with the friction portions 41, leaf spring 5 is deflected to a greater degree than when the same engages with the engaging portion 31a because the friction portions 41 are disposed radially inwardly on the positioning member 31 from the engaging portions 31a. Hence, resistance against the engagement of the engaging member 32 with the friction portions 41 can be made greater than that against the engagement of the engaging member 32 with the engaging portion 31a. In addition, the resistance against engagement can be varied by changing the shape of each engaging portion 31a and friction portion 41, by the degree of engagement of the engaging member 32 with the engaging portion 31a and friction portions 41, or by the shape of holding portion 51. Thus, each holding portion 51, when varied in shape, may have different dimensions between the opposite walls of the holding portion, for example, a semicylindrical section or an elongate slot will vary the contact position of the holding portion 51 with respect to the engaging member 32.

When the lever shifting device of the invention is switched from the operative state of friction mechanism 4 to that of positioning mechanism 3, the switching member 60 rotates counterclockwise in FIG. 10 to move the engaging members 32 through the guide bores 63 radially outwardly of the positioning member 31 along the holding portions 51 respectively. Hence, the engaging members 32 disengage from the friction portions 41 and engage with the engaging portions 31a respectively, whereby the positioning mechanism 3 is put in the operative state while the friction mechanism 4 is placed in the inoperative state.

Figure 11:
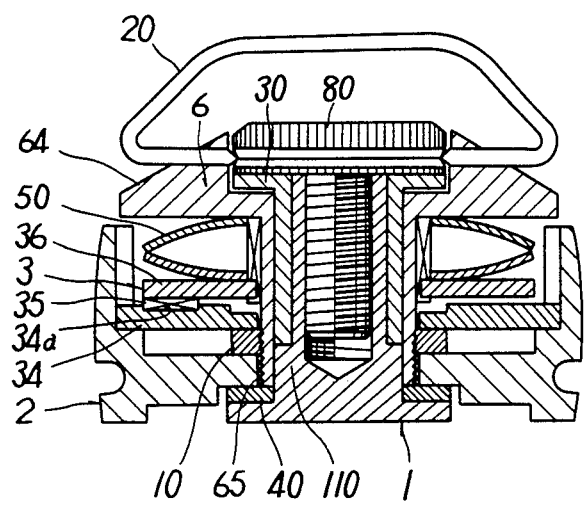
Figure 12:
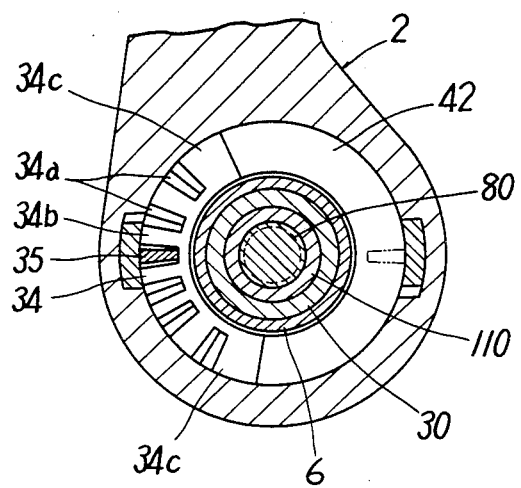
Figure 13:
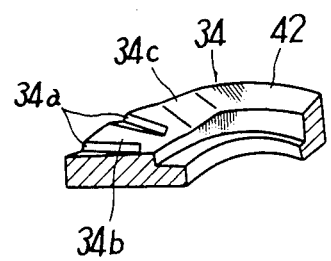
Figure 14:
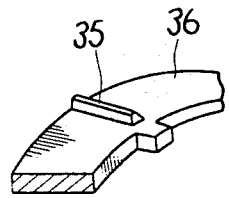
Figure 15:
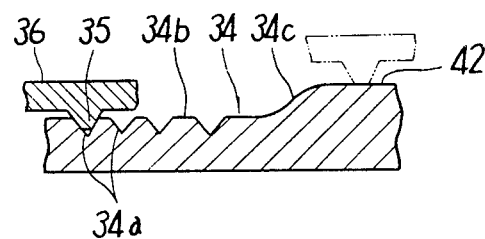

Alternatively, a positioning member 34 may, as shown in FIGS. 11 and 12, be provided at one side with engaging portions 34a and friction portions 42 circumferentially displaced from each other.

In this case, the switching member 60 having no guide mechanism, such as the guide bores 63, is rotated, so that an engaging member 35 engageable with the engaging portion 34a is shifted circumferentially with respect to the positioning member 34, thereby disengaging from the engaging portion 34a and engaging with the friction portions 42.

In the embodiment shown in FIGS. 11 and 12, the engaging portions 34a are formed of splines and the engaging member 35 is formed of a projecting plate, and the friction portion 42, which is a flat surface, may alternatively be rough or serrated. Between the engaging portions 34a and the friction portion 42 are provided axial slopes 34c for axially shifting the friction portion 42 from the engaging portions 34a, thereby making the engaging resistance between the engaging member 35 and the friction portion 42 larger than that between the engaging member 35 and the engaging portions 34a.

Also, as shown in FIGS. 11 and 12, the switching member 60 is cylindrical, and has, at one end, a flange 64, and at the other end, a screw thread 65, and is supported rotatably to a lever shaft 110. This arrangement rotatably supports the operating lever 2 and positioning member 34 and non-rotatably supports the projecting plate 36 integral with the engaging member 35. A dish-like leaf spring 50 is interposed between the plate 36 and the flange 64 and a nut 10 screws with thread 65 to retain the positioning member 34, plate 36, leaf spring 5 and switching member 60 as a unit. A handle 20 is mounted on the flange 64 and the switching member 60 is rotated by the handle 20 to rotate the plate 36 with respect to the positioning member 34. The lever shaft 110 supports, at the fore end, a flanged bush 30. A screw 80 engages a threaded bore at the lever shaft 110 to threadedly connect the switching member 60 to the fixing member 1 through the bush 30. Once unscrewed from the lever shaft 110 the switching member 60 can be rotated.

In addition, in FIGS. 11 and 12, reference numeral 40 designates a washer.

Alternatively, the positioning member may be shifted with respect to the engaging member, in which the engaging member rotates in association with the operating lever and the positioning member is supported shiftably on the fixing member 1.

Although several embodiments have been described, they are merely exemplary of the invention and not to be construed as limiting, the invention being defined solely by the appended claims.

What is claimed is:

1. A lever shifting device for a bicycle adapted to operate a derailleur having a return spring, said lever shifting device comprising:
   a fixing member having a lever shaft,
   an operating lever supported rotatably to said lever shaft,
   a positioning mechanism provided with a positioning member having a plurality of engaging portions and an engaging member engageable with at least one of said engaging portions,
   a friction mechanism having friction portions for applying to said operating lever a rotational resistance against said return spring of said derailleur, said engaging portions and friction portions being disposed in a plane perpendicular to an axis of rotation of said lever shifted from one another, and
   a switching means which shifts one of said positioning member and said engaging member with respect to the other so that said engaging member disengages from said engaging portions and engages with said friction portions, wherein said positioning member lies in a plane perpendicular to the axis of rotation of said lever, said engaging portions and friction portions also lying in said plane.

2. A lever shifting device for a bicycle according to claim 1, wherein said engaging portions and friction portions are disposed on said positioning member at respective radially outward and radially inward positions with respect to the axis of rotation of said lever.

3. A lever shifting device for a bicycle according to claim 1, wherein said engaging portions and friction portions are disposed on said positioning member circumferentially displaced from each other along the rotation direction of said lever.

* * * * *